United States Patent
Kaibara

(10) Patent No.: US 7,071,976 B2
(45) Date of Patent: Jul. 4, 2006

(54) IMAGE SENSING APPARATUS AND CONTROL METHOD THEREFOR

(75) Inventor: Hiroshi Kaibara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 833 days.

(21) Appl. No.: 09/818,171

(22) Filed: Mar. 27, 2001

(65) Prior Publication Data

US 2001/0055065 A1  Dec. 27, 2001

(30) Foreign Application Priority Data

Mar. 28, 2000  (JP) .............................. 2000-088744

(51) Int. Cl.
*H04N 5/76* (2006.01)
*H04N 5/225* (2006.01)

(52) U.S. Cl. .............................. 348/231.99; 348/207.99

(58) Field of Classification Search ............. 348/220.1, 348/231.6, 231.9, 231.99, 372, 207.99; 396/137
See application file for complete search history.

(56) References Cited

U.S. PATENT DOCUMENTS

| | | | | |
|---|---|---|---|---|
| 5,640,619 A | * | 6/1997 | Takayama et al. | 396/137 |
| 5,765,052 A | * | 6/1998 | Ogawa et al. | 396/137 |
| 6,441,854 B1 | * | 8/2002 | Fellegara et al. | 348/372 |
| 6,714,246 B1 | * | 3/2004 | Sawachi | 396/137 |
| 6,757,020 B1 | * | 6/2004 | Kikuchi | 396/137 |

* cited by examiner

*Primary Examiner*—David Ometz
*Assistant Examiner*—Luong T. Nguyen
(74) *Attorney, Agent, or Firm*—Morgan & Finnegan, L.L.P.

(57) ABSTRACT

When the image sensing apparatus is turning on, whether or not a manual image sensing mode was set when the image sensing apparatus was last shut down is determined. If the manual image sensing mode was set, image sensing conditions stored in memory when last shutting down the apparatus are read and set in the image sensing apparatus.

3 Claims, 2 Drawing Sheets

IMAGE SENSING APPARATUS AND CONTROL METHOD THEREFOR

FIELD OF THE INVENTION

The present invention relates to an image sensing apparatus for sensing and recording a still image and/or a moving image and a control method therefor and, more particularly to, setting of image sensing conditions in an image sensing apparatus.

BACKGROUND OF THE INVENTION

Currently, it is possible to check an image to be recorded before actually recording the image using an electrical view finder (EVF) in an image sensing apparatus, especially in a digital camera. Accordingly, in addition to conditions relating to, e.g., exposure correction, date and shutter speed, which can be set in a camera that records an image on a film, conditions relating to, e.g., white balance, image size, compression ratio, and electronic zooming can be set.

Some users rely on automatic condition setting of camera for setting various values in a camera, and some users would rather set the values by themselves. Thus, a way of setting the values depends on a user.

When shutting down a camera and then powering it on, some users may want to sense an image using the identical values set before shutting down the camera. Whereas, some users may want to initialize the values.

SUMMARY OF THE INVENTION

The present invention has been made in consideration of the above situation, and has as its object to provide an image sensing apparatus capable of automatically setting image sensing conditions either to predetermined conditions or to previously used conditions when turning on the image sensing apparatus and a control method therefor.

According to the present invention, the foregoing object is attained by providing an image sensing apparatus comprising: an operation unit to set image sensing conditions; memory to store the image sensing conditions; determination means for determining whether or not a predetermined image sensing condition was set when the image sensing apparatus was last shut down; and control means for, in a case where the predetermined image sensing condition was set, controlling to read the image sensing conditions stored in the memory and set the image sensing conditions in the image sensing apparatus when turning on the image sensing apparatus.

According to the present invention, the foregoing object is also attained by providing a control method for an image sensing apparatus comprising: a determination step of determining whether or not a predetermined image sensing condition was set when the image sensing apparatus was last shut down; a reading step of, in a case where the predetermined image sensing condition was set, reading the image sensing conditions stored in memory; and a setting step of setting the read image sensing conditions in a case where the predetermined image sensing condition was set, or default image sensing conditions in a case where the predetermined image sensing condition was not set, in the image sensing apparatus when turning on the image sensing apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

DETAILED DESCRIPTION OF THE PREFERRED EMBODIMENT

A preferred embodiment of the present invention will be described in detail, below, in accordance with the accompanying drawings.

Figure 1:
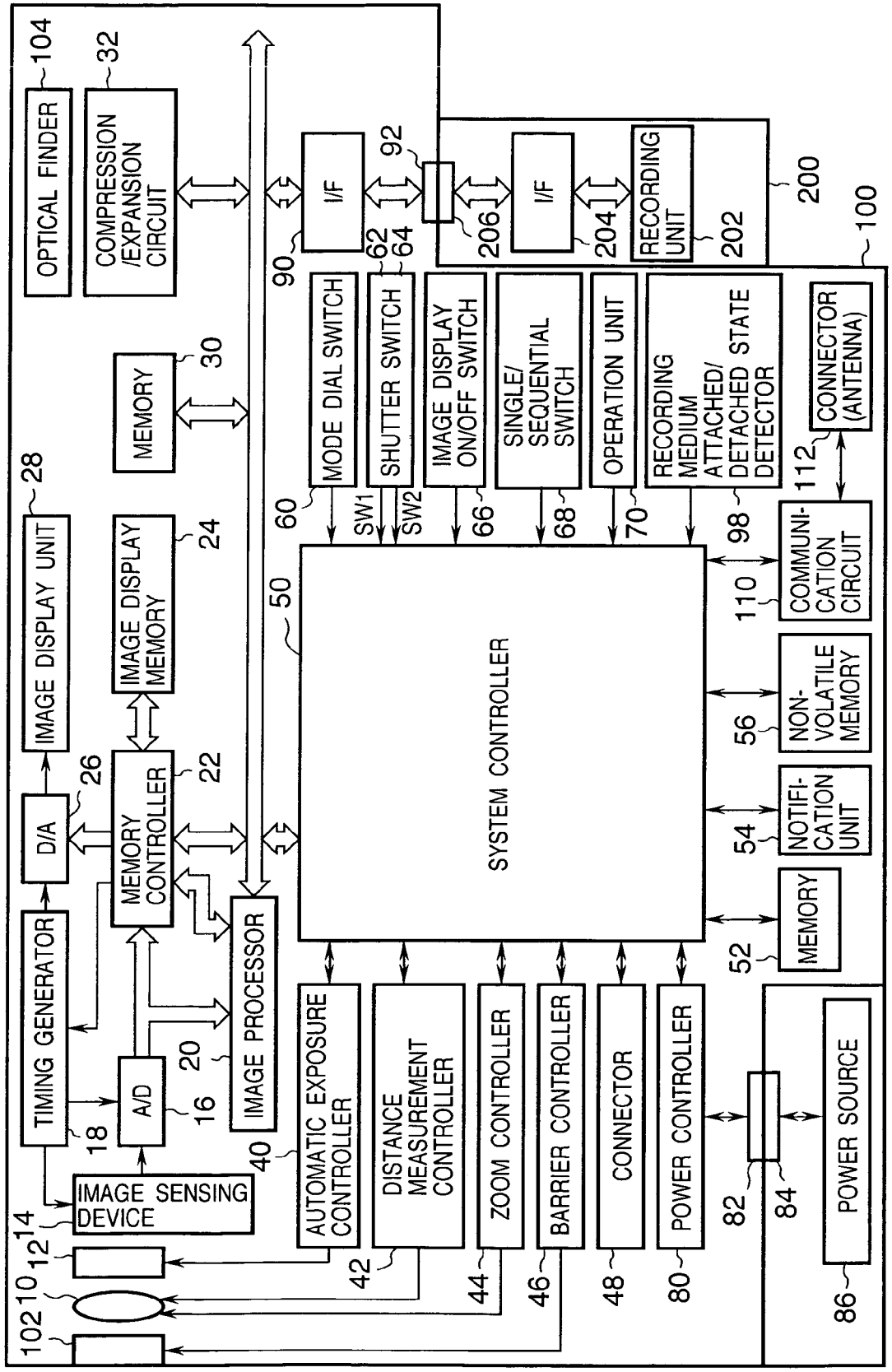
FIG. 1 is a block diagram showing a configuration of an image sensing apparatus according to an embodiment of the present invention.

FIG. 1 is a block diagram showing a configuration of an image sensing apparatus according to the embodiment of the present invention.

In FIG. 1, reference numeral 100 denotes an image sensing apparatus such as a digital camera. In the image sensing apparatus 100, 10 denotes an image sensing lens; 12, a shutter having a diaphragm function; 14, an image sensing device which converts an optical image into an electric signal; 16, an A/D converter which converts an analog signal output from the image sensing device 14 into a digital signal; 18, a timing generator which supplies a clock signal and a control signal respectively to the A/D converter 16 and a D/A converter 26 under the control of a memory controller 22 and a system controller 50. Numeral 20 denotes an image processor which performs predetermined pixel interpolation processing, color conversion processing and the like on image data from the A/D converter 16 or image data from the memory controller 22. The image processor 20 performs predetermined calculation processing using the image data outputted from the A/D converter 16, and the system controller 50 performs through-the-lens (TTL) auto focus (AF) processing, auto exposure (AE) processing, pre-flash (EF) processing on an exposure controller 40 and a distance measurement controller 42, based on the result of calculations. Further, the image processor 20 performs predetermined calculation using the image data outputted from the A/D converter 16, and performs TTL auto white balance (AWB) processing, based on the result of calculations.

The memory controller 22 controls the A/D converter 16, the timing generator 18, the image processor 20, an image display memory 24, the D/A converter 26, a memory 30 and a compression/expansion circuit 32. The image data outputted from the A/D converter 16 is written into the image display memory 24 or the memory 30 via the image processor 20 and the memory controller 22, or only via the memory controller 22.

Numeral 28 denotes an image display unit comprising a liquid crystal display (LCD) or the like. Image data written into the image display memory 24 is displayed on the image display unit 28 via the D/A converter 26. An electronic finder function is realized by sequentially displaying obtained images on the image display unit 28. Further, image display unit 28 arbitrarily turns ON/OFF its display in accordance with an instruction from the system controller 50. If the display is turned OFF, the electric consumption of the image sensing apparatus 100 can be greatly reduced. The image display unit 28 is connected to the image sensing apparatus 100 with a rotatable hinge, thus a user can see the image display unit 28 functioning as an electric view finder or displaying an image and other information while moving the image display unit 28 to a desired direction and angle.

Further, the image display unit 28 can be folded to one side of the image sensing apparatus 100 with a display monitor facing to the image sensing apparatus 100. In this case, an image display unit open/close detecting means (not shown) may be added, and when the image display unit open/close detecting means detects that the image display unit 28 is folded in the aforesaid manner, display of the image display unit 28 may be automatically turned off.

The memory 30, used for storing obtained still images and moving images, has a sufficient storage capacity for storing a predetermined number of still images and/or a moving image for a predetermined period. In sequential image sensing to sequentially obtain a plural number of still images or panoramic image sensing, a large amount of image data can be written into the memory 30 at a high speed. Further, the memory 30 may be used as a work area for the system controller 50.

The compression/expansion circuit 32 compresses or expands image data by adaptive discrete cosine transformation (ADCT) or the like. The compression/expansion circuit 32 reads image data stored in the memory 30 and performs compression or expansion processing on the read image data, and writes the processed data into the memory 30.

The exposure controller 40 controls the shutter 12 having the diaphragm function. The exposure controller 40 interlocked with a flash (not shown) also has a flash adjusting function. The distance measurement controller 42 controls focusing of the image sensing lens 10. Numeral 44 denotes a zoom controller which controls zooming of the image sensing lens 10. Numeral 46 denote a barrier controller which controls the operation of a barrier 102 to protect the lens. Numeral 48 denotes a connector, often called an accessory shoe, having an electrical connection portion and a mechanical fixing member to fix with a flash (not shown).

The system controller 50 controls the exposure controller 40 and the distance measurement controller 42 by the TTL method, in accordance with the result of calculations by the image processor 20 based on the image data from the A/D converter 16.

The system controller 50 controls the overall image sensing apparatus 100. Memory 52 stores constants, variables, and programs for operation of the system controller 50.

Numeral 54 denotes a notification unit which notifies operating statuses, messages and the like to the outside by using characters, images, sound and the like, in correspondence with execution of program by the system controller 50. The notification unit 54 comprises one or more combinations of display devices including an LCD and an LED for visual notification and sound generating devices for audio notification. Especially, the display device or devices is/are provided in a single or plural visually-recognizable positions around an operation unit 70 of the image sensing apparatus 100. Further, one function of the notification unit 54 is provided within an optical finder (or optical view finder: OVF) 104.

The display contents of the notification unit 54, displayed on the LCD or the like, include indication of single shot/sequential image sensing, a self timer, a compression rate, the number of recording pixels, the number of recorded images, the number of recordable images, a shutter speed, an f number (aperture), exposure compensation, flash illumination, pink-eye effect mitigation, macro image sensing, a buzzer-set state, a timer battery level, a battery level, an error state, information of plural digit numbers, attached/detached status of a recording medium 200, operation of communication I/F, and date and time.

Further, the display contents of the notification unit 54, displayed within the optical finder 104, include a focus state, a camera shake warning, a flash charge state, the shutter speed, the f number (aperture), and the exposure compensation.

Numeral 56 denotes an electrically erasable and recordable nonvolatile memory such as an EEPROM. Numerals 60, 62, 64, 66, 68 and 70 denote operation means for inputting various operation instructions to the system controller 50, comprising a single or plurality of combinations of switches, dials, touch panels, a device for pointing by line-of-sight detection, a voice recognition device, and the like.

Next, the operation means will be described in more detail.

Numeral 60 denotes a mode dial switch for selecting various function modes such as a power OFF mode, an automatic image sensing mode, an image sensing mode, a panoramic image sensing mode, a reproduction mode, a multi-image reproduction/deletion mode, and a PC connection mode.

Numeral 62 denotes a shutter switch SW1 which is turned ON by half stroke of a shutter button (not shown), to instruct start of the operations of the AF processing, the AE processing, the AWB processing, the EF processing and the like.

Numeral 64 denotes a shutter switch SW2 which is turned ON by full stroke of the shutter button (not shown), to instruct start of a series of operations of exposure processing to write a signal read from the image sensing device 14 into the memory 30 via the A/D converter 16 and the memory controller 22, development processing by using calculations by the image processor 20 and the memory controller 22, and recording processing to read the image data from the memory 30, compress the image data by the compression/expansion circuit 32, and write the compressed image data into the recording medium 200.

An image display ON/OFF switch 66 can set ON/OFF of the image display unit 28. With this function, in image sensing using the optical finder 104, power supply to the image display unit 28 comprising an LCD or the like can be cut to save the electric power.

A single/sequential switch 68 switches between a single shot mode for recording a frame image and shifting to an idle state thereafter for each pressing of the shutter switch SW2 and a sequential mode for continuously recording frame images while the shutter switch SW2 is pressed.

Numeral 70 denotes an operation unit comprising various buttons and touch panels including a menu button, a set button, a macro/non-macro selection button, a multi-image reproduction/repaging button, a single-shot/sequential/self-timer image sensing selection button, a forward (+) menu item selection button, a backward (−) menu item selection button, a forward (+) reproduction image search button, a backward (−) reproduction image search button, an image sensing quality selection button, an exposure correction button, a date/time set button, a selection/switch button for selecting and switching various functions when, e.g., sensing in a panoramic mode and reproducing recorded images, a button for initiating audio recording, a set/execution button for setting and executing various functions when, e.g., sensing in a panoramic mode and reproducing recorded images, a quick review ON/OFF switch for setting a quick review function of automatically reproducing a recorded image immediately after sensing the image, a compression mode switch for selecting a compression ratio for JPEG compression or a CCDRAW mode for directly digitizing the signals from the image sensing device 14 and recording the digital signals to a recording medium, a reproduction mode switch capable of setting one of various functional modes, such as a reproduction mode, a multi-image reproduction and erasing mode, and a PC connection mode, a reproduction switch for, in an image sensing mode, designating to read a sensed image from the memory 30 or the recording medium 200 and start displaying the image on the image display unit 28, a drive button for changing an active drive, a reproduction display switch button for switching between single image display and multi-image display in the reproduction mode, and an information display button for displaying incidental information of a recorded image.

Numeral 80 denotes a power controller comprising a battery detection circuit, a DC—DC converter, a switch circuit to select the block to be energized and the like. The power controller 80 detects the attached/detached state of the battery, the battery type and the remaining battery power level, controls the DC—DC converter based on the results of detection and an instruction from the system controller 50, and supplies necessary voltages to the respective parts including the recording medium for the necessary period.

Numerals 82 and 84 denote connectors; and 86, the power source comprising a primary battery such as an alkaline battery or a lithium battery, a secondary battery such as an NiDd battery, an NiMH battery or an Li battery, an AC adapter, and the like.

Numeral 90 denotes interface for recording media such as a memory card or a hard disk; and 92, connector for connection with the recording medium such as a memory card or a hard disk. A recording medium attached/detached state detector 98 detects whether recording medium 200 is attached to the connector 92.

In the present embodiment, a single system of interface and connector for connection with the recording medium is employed. However, the number of systems is not limited, and a plurality of systems of interfaces and connectors may be provided. Further, interfaces and connectors pursuant to different standards may be combined.

As the interfaces and connectors, cards in conformity with Personal Computer Memory Card International Association standards (PCMCIA cards) and cards in conformity with compact flash (CF) card standards may be used. In a case where cards and connectors in conformity with the PCMCIA standards, CF card standards and the like are used as the interface 90 and the connectors 92, image data and management information attached to the image data are transmitted/received among other peripheral devices such as a computer and a printer by connection with various communication cards such as a LAN card, a modem card, a USB card, an IEEE 1394 card, a P1284 card, an SCSI card and a PHS card.

The barrier 102 covers the image sensing portion of the image sensing apparatus 100 including the lens 10, thus prevents dirt and breakage of the image sensing portion.

The optical finder 104 can be used for image sensing without the electronic finder function by the image display unit 28. In the optical finder 104, realized are some of the functions of the notification unit 54 including the indication of focus state, the camera shake warning, the flash charge state, the shutter speed, the f number (aperture), the exposure compensation and the like.

A communication circuit 110 can communicate in various communication method, such as RS232C, USB, IEEE 1394, P1284, SCSI, modem, LAN, and radio wave.

Numeral 112 denotes a connector for connecting the image sensing apparatus 100 with other devices, or an antenna when communicating via radio wave.

The recording medium 200 comprises a memory card, a hard disk or the like. The recording medium 200 has a recording unit 202 of a semiconductor memory, a magnetic disk or the like, the interface 204 for communication with the image sensing apparatus 100, and the connector 206 for connection with the image sensing apparatus 100.

Image sensing conditions according the embodiment of the present invention are listed as follows.

Image sensing mode (automatic/manual)
Finder (OVF/EVF)
Display of setting conditions (ON/OFF)
Compression ratio of image size (L, superfine/L, fine/S, fine/SS)
Drive (single/fast/fast sequential/self timer)
Strobe mode (automatic/automatic anti-pinkeye/forced flash/OFF/slow synchronization)
Focus (normal/macro/land view(fixed to infinite length))
Exposure correction (−2 to +2, ½ step)
White balance (automatic/sun/clouded/incandescent light/fluorescent light)
Electronic zooming (OFF/twice/four times)

In the foregoing image sensing conditions, "image sensing mode" is for setting whether a user sets conditions of other items listed above by himself/herself or leaves the setting to an automatic control of the image sensing apparatus. "Display of setting conditions" is for selecting whether or not to display the setting conditions on the notification unit 54, "compression ratio of image size" is for setting the number of pixels which represents a spatial resolution of an image and an compression ratio in JPEG compression, "drive" is for selecting one of single image sensing, fast image sensing, fast sequential image sensing, and image sensing using self timer, "strobe mode" is for selecting a way of flashing a strobe light, "white balance" is for causing a user to select automatic or a circumstance under which an image sensing operation is taken place so that white balance correction will be performed using appropriate correction data, and "electronic zooming" is for selecting whether or not to digitally zoom in/out an image.

In this embodiment, a user can set the finder, drive, strobe mode, and focus when "automatic" is selected as the image sensing mode, and when "manual" is selected as the image sensing mode, all of the other items can be set by the user.

In the embodiment, the set conditions are stored in the non-volatile memory 56 when shutting down the image sensing apparatus 100. When turning on the image sensing apparatus 100, if the manual image sensing mode is selected, the conditions stored in the non-volatile memory 56 are read first, then, setting the conditions to the image sensing apparatus 100 is performed based on the read conditions.

ON/OFF of storing the image sensing conditions may be added to the aforesaid list, and the image sensing conditions may be stored if the storing of the image sensing conditions is set ON.

Figure 2:
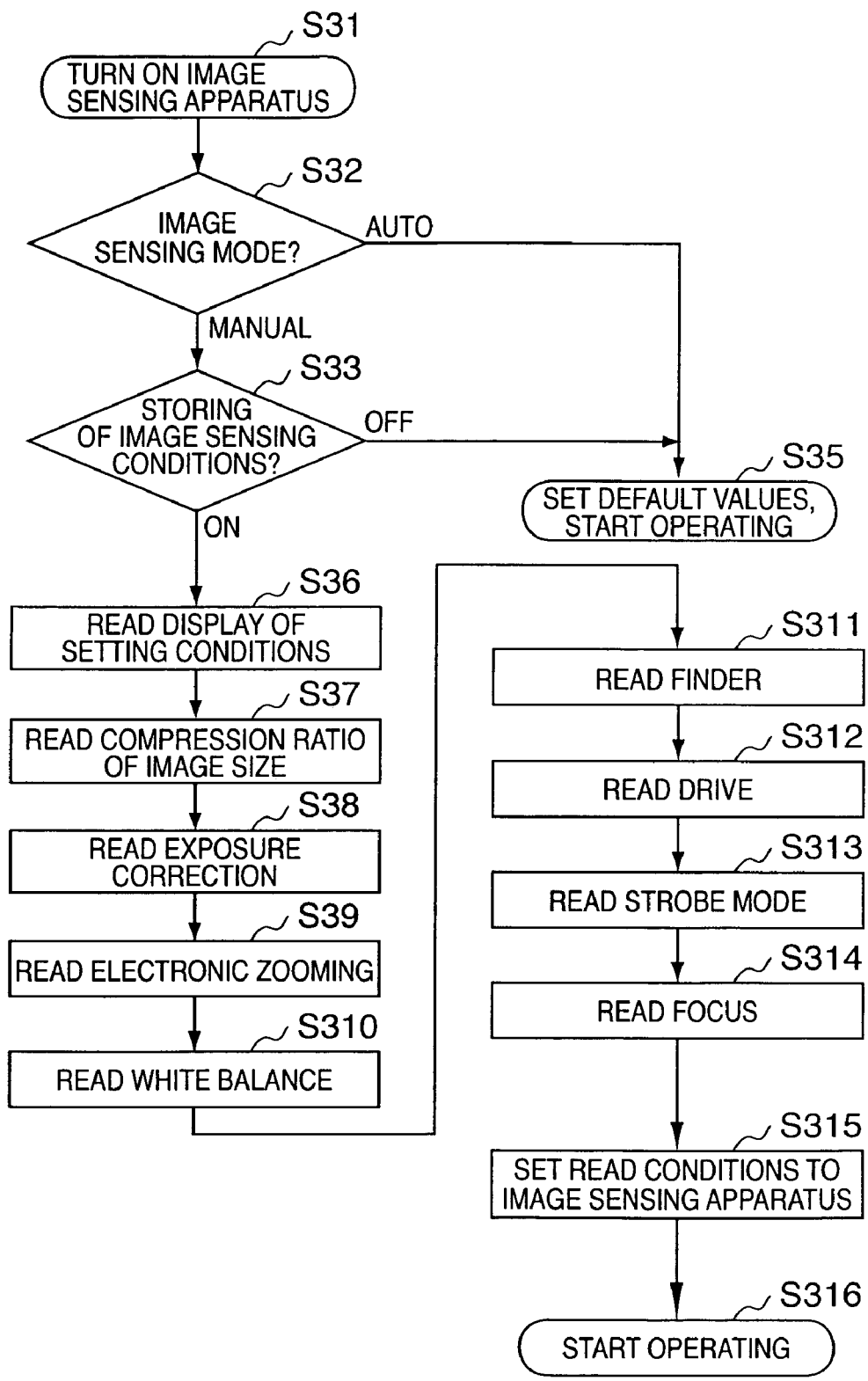
FIG. 2 is a flowchart showing an operational sequence of the image sensing apparatus when turning on the image sensing apparatus according to the embodiment of the present invention.

FIG. 2 is a flowchart showing an operational sequence of the image sensing apparatus 100 when turning on the image sensing apparatus 100.

After turning on the image sensing apparatus 100 (step S31), first, an image sensing mode, set at the time of shutting down the apparatus 100 previously, which is stored in the non-volatile memory 56 is read (step S32). If it indicates automatic, then the image sensing conditions are set to default values, thereafter the image sensing apparatus 100 starts operating (step S35). When it indicates manual, then whether the storing of image sensing conditions is set ON or OFF is read (step S33). If OFF, then the image sensing conditions are set to default values and the image sensing apparatus 100 starts operating (step S35).

If ON, then stored values of various image sensing conditions, such as display of setting conditions (step S36), compression ratio of image size (step S37), exposure correction (step S38), electronic zooming (step S39), white balance (step S310), finder (step S311), drive (step S312), strobe mode (step S313), and focus (step S314), are read. The read conditions are set in the image sensing apparatus 100 (step S315), then the apparatus 100 starts operating (step S316).

When shutting down the image sensing apparatus 100, all the setting values may or may not be stored depending upon the ON/OFF state of storing the image sensing conditions in the non-volatile memory 56 or always stored regardless of any conditions. Further, the image sensing conditions may be stored if the manual image sensing mode is set, and not stored if the automatic image sensing mode is set.

Statistically, a user who uses the image sensing apparatus in the manual image sensing mode tends to use the same setting at the next image sensing operation. Therefore, the previously set image sensing conditions are read when the manual mode is selected and not read when the automatic mode is selected in the aforesaid embodiment. However, the present invention is not limited to this, and it is possible to control to read or not read the previously set image sensing conditions depending upon other condition, e.g., ON/OFF state of storing image sensing conditions.

Further, the image sensing apparatus 100 may be configured so that the previously set image sensing conditions are read in response to a predetermined operation, such as pressing a predetermined button when turning on the image sensing apparatus 100.

Furthermore, the image sensing conditions to be stored in the non-volatile memory 56 is not limited to those at shutting down the image sensing apparatus 100, and may be stored at arbitrary timings. Further, it is not necessary to store all of the image sensing conditions, and conditions selected by a user may be stored. In this case, non-selected conditions may be set to default values first, then changed after the image sensing apparatus 100 starts operating.

According to the embodiment of the present invention as described above, image sensing conditions are automatically set to those used previously, operability increases.

OTHER EMBODIMENT

The present invention can be applied to a system constituted by a plurality of devices (e.g., host computer, camera head, PC card) or to an apparatus comprising a single device (e.g., digital camera, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiment, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides the aforesaid functions according to the above embodiment are realized by executing the program codes which are read by a computer, the present invention includes a case where an OS (operating system) or the like working on the computer performs a part or the entire processes in accordance with designations of the program codes and realize functions according to the above embodiment.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or the entire process in accordance with designations of the program codes and realizes functions of the above embodiment.

In a case where the present invention is applied to the aforesaid storage medium, the storage medium stores program codes corresponding to the flowchart described in the embodiment.

The present invention is not limited to the above embodiments and various changes and modifications can be made within the spirit and scope of the present invention. Therefore to apprise the public of the scope of the present invention, the following claims are made.

What is claimed is:

1. An image sensing apparatus comprising:
   an operation unit configured to set image sensing conditions manually in the image sensing apparatus;
   a selection unit configured to select whether or not to use, when the image sensing apparatus is turned on next time, the image sensing conditions manually set at a time of turning off the image sensing apparatus;
   a memory device configured to store the manually set image sensing conditions of the image sensing apparatus when the image sensing apparatus is turned off;
   a determination unit configured to determine, at a time of turning on the image sensing apparatus, whether or not said selection unit selects to use the manually set image sensing conditions at the time of turning off the image sensing apparatus when the image sensing apparatus is turned on; and
   a control unit configured to, when a determination result of said determination unit is affirmative, control to automatically read the manually set image sensing conditions stored in said memory device and to automatically set the read manually set image sensing conditions in the image sensing apparatus,
   wherein the manually set image sensing conditions are selected from the group including view finder mode, display of setting conditions, compression ratio of image size, drive mode, strobe mode, focus type, exposure correction, white balance and electronic zooming.

2. A control method for an image sensing apparatus comprising:

selecting whether or not to use, when the image sensing apparatus is turned on next time, the image sensing conditions manually set at a time of turning off the image sensing apparatus;

storing manually set image sensing conditions of the image sensing apparatus in a memory device when the image sensing apparatus is turned off;

determining, at a time of turning on the image sensing apparatus, whether or not the manually set image sensing conditions at the time of turning off the image sensing apparatus is selected to be used when the image sensing apparatus is turned on;

automatically reading the manually set image sensing conditions stored in the memory device; and automatically setting the read manually set image sensing conditions in the image sensing apparatus when a determination result is affirmative, or automatically setting default image sensing conditions when the determination result is negative, wherein the manually set image sensing conditions are selected from the group including view finder mode, display of setting conditions, compression ratio of image size, drive mode, strobe mode, focus type, exposure correction, white balance and electronic zooming.

3. A computer program product comprising a computer usable medium having computer readable program code means embodied in said medium for a control method for an image sensing apparatus, the program code means, when executed, causes a computer to carry out the steps of:

selecting whether or not to use, when the image sensing apparatus is turned on next time, the image sensing conditions manually set at a time of turning off the image sensing apparatus;

storing manually set image sensing conditions of the image sensing apparatus in a memory device when the image sensing apparatus is turned off;

determining, at a time of turning on the image sensing apparatus, whether or not the manually set image sensing conditions at the time of turning off the image sensing apparatus is selected to be used when the image sensing apparatus is turned on;

automatically reading the manually set image sensing conditions stored in the memory device when the determination result is affirmative; and automatically setting the read manually set image sensing conditions in the image sensing apparatus when the determination result is affirmative, or automatically setting default image sensing conditions when the determination result is negative, wherein the manually set image sensing conditions are selected from the group including view finder mode, display of setting conditions, compression ratio of image size, drive mode, strobe mode, focus type, exposure correction, white balance and electronic zooming.

* * * * *

UNITED STATES PATENT AND TRADEMARK OFFICE
CERTIFICATE OF CORRECTION

| | |
|---|---|
| PATENT NO. | : 7,071,976 B2 |
| APPLICATION NO. | : 09/818171 |
| DATED | : July 4, 2006 |
| INVENTOR(S) | : Kaibara |

It is certified that error appears in the above-identified patent and that said Letters Patent is hereby corrected as shown below:

In claim 2 (col. 9, line 19), please replace "selling" with --setting--.

Signed and Sealed this

Thirteenth Day of February, 2007

JON W. DUDAS
*Director of the United States Patent and Trademark Office*